United States Patent
Kohli (10) Patent No.: US 12,093,915 B2
(45) Date of Patent: *Sep. 17, 2024

(54) SYSTEMS AND METHODS FOR DYNAMICALLY GENERATING CUSTOMIZED RECORDS

(71) Applicant: MASTERCARD INTERNATIONAL INCORPORATED, Purchase, NY (US)

(72) Inventor: Manoneet Kohli, White Plains, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/359,713

(22) Filed: Jul. 26, 2023

(65) Prior Publication Data

US 2023/0368172 A1 Nov. 16, 2023

Related U.S. Application Data

(63) Continuation of application No. 15/467,931, filed on Mar. 23, 2017, now Pat. No. 11,741,451.

(51) Int. Cl.
*G06Q 30/00* (2023.01)
*G06Q 20/04* (2012.01)
(Continued)

(52) U.S. Cl.
CPC ......... *G06Q 20/209* (2013.01); *G06Q 20/047* (2020.05); *G06Q 20/363* (2013.01); *G06Q 30/04* (2013.01); *G07G 5/00* (2013.01)

(58) Field of Classification Search
CPC .................................................. G06Q 20/209
See application file for complete search history.

(56) References Cited

U.S. PATENT DOCUMENTS 7,487,912 B2 2/2009 Seifert et al.
7,987,120 B2 7/2011 Shiftan et al.
(Continued)

FOREIGN PATENT DOCUMENTS

WO 2012083113 A2 6/2012

OTHER PUBLICATIONS

PCT International Search Report and Written Opinion, Application No. PCT/US2018/017343, dated Apr. 20, 2018, 11 pps.

*Primary Examiner* — Talia F Crawley
(74) *Attorney, Agent, or Firm* — Armstrong Teasdale LLP (57) ABSTRACT

A dynamic receipt generating (DRG) computing device is provided. The DRG computing device is configured to receive user preference data including dynamic receipt preference data, and a payment account identifier associated with a user. The DRG computing device is also configured to store the user preference data, and receive real-time transaction data associated with a purchase made by the user using a payment account associated with the payment account, the real-time transaction data being in a first format. The DRG computing device is further configured to retrieve the user preference data from the memory based on the payment account identifier, and generate a dynamic receipt based on the real-time transaction data and the retrieved user preference data associated with the payment account identifier. The dynamic receipt having a second format different from the first format, and to transmit the generated dynamic receipt to the user.

20 Claims, 6 Drawing Sheets (51) Int. Cl.
  *G06Q 20/20* (2012.01)
  *G06Q 20/36* (2012.01)
  *G06Q 30/04* (2012.01)
  *G06Q 30/06* (2023.01)
  *G07G 5/00* (2006.01)

(56) References Cited

U.S. PATENT DOCUMENTS

| | | |
|---|---|---|
| 7,992,781 B2 | 8/2011 | Hammad |
| 8,442,844 B1* | 5/2013 | Trandal ............... G06Q 30/012 |
| | | 705/35 |
| 9,355,391 B2 | 5/2016 | von Behren et al. |
| 10,192,217 B1* | 1/2019 | Ellis .................... G06Q 20/322 |
| 10,650,434 B2* | 5/2020 | High ..................... G06F 16/22 |
| 2002/0161721 A1 | 10/2002 | Yuan et al. |
| 2003/0055739 A1* | 3/2003 | Takaba ............... H04N 1/00132 |
| | | 705/26.8 |
| 2004/0064373 A1 | 4/2004 | Shannon |
| 2004/0220964 A1 | 11/2004 | Shiftan et al. |
| 2005/0061870 A1* | 3/2005 | Stockton ................ G07G 3/003 |
| | | 235/380 |
| 2010/0306080 A1* | 12/2010 | Trandal .................. G06Q 10/10 |
| | | 705/26.8 |
| 2011/0125598 A1 | 5/2011 | Shin et al. |
| 2011/0145082 A1 | 6/2011 | Hammad |
| 2012/0158584 A1* | 6/2012 | Behren .................. G06Q 20/10 |
| | | 705/41 |
| 2012/0158654 A1 | 6/2012 | Behren et al. |
| 2012/0244462 A1* | 9/2012 | Takahashi ............... C07C 46/00 |
| | | 552/209 |
| 2012/0290422 A1* | 11/2012 | Bhinder ................ G06Q 20/20 |
| | | 705/21 |
| 2012/0290609 A1* | 11/2012 | Britt ...................... G06F 16/245 |
| | | 707/769 |
| 2013/0013499 A1* | 1/2013 | Kalgi ..................... G06Q 20/36 |
| | | 705/41 |
| 2013/0132067 A1* | 5/2013 | Gelbman ............ G06F 16/3337 |
| | | 704/8 |
| 2014/0019317 A1* | 1/2014 | Casares ................. G06Q 40/12 |
| | | 705/30 |
| 2014/0067568 A1* | 3/2014 | Argue .................... G06Q 10/08 |
| | | 705/28 |
| 2014/0074675 A1* | 3/2014 | Calman ................ G06Q 20/047 |
| | | 705/35 |
| 2014/0074690 A1 | 3/2014 | Grossman et al. |
| 2014/0122279 A1* | 5/2014 | Argue .................... G06Q 30/04 |
| | | 705/26.1 |
| 2014/0156394 A1* | 6/2014 | Argue ............... G06Q 30/0255 |
| | | 705/14.53 |
| 2014/0244414 A1 | 8/2014 | Runkle et al. |
| 2014/0244462 A1* | 8/2014 | Maenpaa ............ G06Q 20/047 |
| | | 705/35 |
| 2014/0310174 A1* | 10/2014 | Heeter ................... G06Q 20/40 |
| | | 455/411 |
| 2016/0148182 A1* | 5/2016 | Craine ............... G06Q 20/3278 |
| | | 705/16 |
| 2016/0247155 A1 | 8/2016 | Hammad |
| 2018/0005200 A1* | 1/2018 | Hajji ..................... G07G 1/0009 |
| 2018/0144375 A1* | 5/2018 | Wang ................. G06Q 30/0275 |

* cited by examiner

SYSTEMS AND METHODS FOR DYNAMICALLY GENERATING CUSTOMIZED RECORDS

CROSS REFERENCE TO RELATED APPLICATIONS

This application is a continuation of, and claims priority to, U.S. patent application Ser. No. 15/467,931, filed Mar. 23, 2017, the entire contents of which are hereby incorporated by reference in their entirety.

BACKGROUND OF THE DISCLOSURE

This disclosure relates generally to dynamically generating customized records and, more specifically, to systems and methods for generating a dynamic record such as a receipt associated with a payment transaction that is customized by the customer.

In a variety of transactions, consumers or buyers of goods or services typically receive receipts from their respective merchants or service providers as proof of that the transactions were completed. Generally, receipts are issued by merchants and service providers for a number of reasons including, for example, regulatory or tax reasons and convenience purposes. A receipt provides information about a corresponding transaction for the purpose of providing all participants with a documented history or record of the transaction. Receipts can later be used by a consumer for various purposes including, for example, proving participation in a transaction for tax reporting purpose, reimbursement purposes from an employer, product returns, use as a claim ticket for a further transaction, provisioning warranties, etc. Depending on a variety of factors, such as, for example, items being purchased, business or personal purchase, amount of purchase, etc., a consumer may desire an electronic receipt and/or a paper receipt.

For in-store purchases, consumers generally obtain a paper receipt at the point-of-sale. However, some point-of-sale systems also support the delivery of digital receipts at the point-of-sale. Further, for telephone or online purchases digital receipts are typically delivered to a customer.

However, receipt delivery mechanisms are typically rigid and may not allow a user to configure desired receipt types (e.g., digital and/or paper) for use at checkout. For example, a conventional point-of-sale ("POS") system typically includes a POS terminal, one or more peripheral devices (display monitor, receipt printer, barcode scanner, weigh scale, electronic signature pad) and a card reader device with pin pad (for credit and debit cards). The data for sales transactions is usually stored in a storage device of the POS terminal, which may be uploaded to one of a remote transaction authorization server or another remote server of the credit/debit card companies. Although POS systems are well equipped for merchants to monitor and collect transaction data collected by the POS system, the ability of the customer to input or extract useful information from the POS system is typically limited to pin pad interactions and obtaining printed receipts, the format and content of which has been pre-determined by the merchant.

Even when digital receipts are generated, the digital receipts may be in a pre-configured format that is not adjustable. For example, digital receipts may appear like paper receipts that are provided to a customer at the POS system. The digital receipts may include a store identifier, a receipt identifier, a date and time of purchase, and various receipt items having item identifiers and item information. The receipt items are typically listed in the order the items are scanned at the POS system. Thus, even if digital receipts are provided, a customer has no input into how the digital receipt is formatted.

Accordingly, these known systems and methods that provide receipts to customers do not allow customers to configure how the receipts are formatted. Thus, there is a need for a technical solution to improve the ability of customers to format receipts automatically according to customers' preferences.

BRIEF DESCRIPTION OF THE DISCLOSURE

In one aspect, a dynamic receipt generating (DRG) computing device for dynamically generating customized transaction records is provided. The DRG computing device includes at least one processor in communication with at least one memory device. The DRG computing device is configured to receive user preference data including dynamic receipt preference data, and a payment account identifier associated with a user. The DRG computing device is also configured to store the user preference data in memory and to receive real-time transaction data associated with a purchase made by the user using a payment account associated with the payment account, the real-time transaction data being in a first format. The DRG computing device is further configured to retrieve the user preference data from the memory based on the payment account identifier. The DRG computing device is configured to generate a dynamic receipt based on the real-time transaction data and the retrieved user preference data associated with the payment account identifier, the dynamic receipt having a second format different from the first format, and to transmit the generated dynamic receipt to the user.

In another aspect, a computer-implemented method for dynamically generating customized transaction records is provided. The method is implemented using a DRG computing device including at least one processor in communication with at least one memory device. The method includes receiving user preference data including dynamic receipt preference data, and a payment account identifier associated with a user, and storing the user preference data in memory. The method also includes receiving real-time transaction data associated with a purchase made by the user using a payment account associated with the payment account, the real-time transaction data being in a first format. The method further includes retrieving the user preference data from the memory based on the payment account identifier. The method includes generating a dynamic receipt based on the real-time transaction data and the retrieved user preference data associated with the payment account identifier, the dynamic receipt having a second format different from the first format, and transmitting the generated dynamic receipt to the user.

In yet another aspect, a non-transitory computer readable medium including computer executable instructions for generating dynamic customized receipts readable by a computing device is provided. When executed by a DRG computing device including a processor and a memory device, the computer executable instructions cause the DRG computing device to receive user preference data including dynamic receipt preference data, and a payment account identifier associated with a user, and to store the user preference data in memory. The computer executable instructions also cause the DRG computing device to receive real-time transaction data associated with a purchase made by the user using a payment account associated with the payment account, the real-time transaction data being in a first format. The computer executable instructions further cause the DRG computing device to retrieve the user preference data from the memory based on the payment account identifier. The computer executable instructions cause the DRG computing device to generate a dynamic receipt based on the real-time transaction data and the retrieved user preference data associated with the payment account identifier, the dynamic receipt having a second format different from the first format, and to transmit the generate dynamic receipt to the user.

BRIEF DESCRIPTION OF THE DRAWINGS

FIGS. 1-6 show example embodiments of the methods and systems described herein.

DETAILED DESCRIPTION OF THE DISCLOSURE

The systems and methods described herein are for generating dynamic receipts for users using a receipt generation system that includes a dynamic receipt generation (DRG) computing device. As described herein, a dynamic receipt is a receipt that is customized according to certain rules or preferences that are provided or inputted into the system by the user customer. In the example embodiment, the DRG computing device includes at least one processor and a memory. The DRG computing device receives receipt generation preference data from a user via a user computing device. The DRG computing device and/or a merchant uses the receipt generation preference data to generate dynamic, customized receipts for the user. A dynamic receipt is provided to the user by either the merchant using the POS system or by the DRG computing device by sending the dynamic receipt to a user via a digital wallet associated with the user.

In a first embodiment, dynamic receipts are generated by the DRG computing device, communicated to a digital wallet stored on the customer's user device, and stored and/or displayed in the digital wallet. The digital wallet also provides a user interface for entering information for use in payment transactions initiated by a cardholder wherein the cardholder is the user customer associated with a payment card stored within the digital wallet. The user interface is part of the cardholder user device. The user interface further enables a user cardholder to access, among other things, dynamic receipts stored in the digital wallet. As described herein, the term "payment card" includes cards such as credit cards, debit cards, and prepaid cards. The digital wallet is a computer application or snippet of code that stores this information for use in online purchases (for example, via the Internet) and offline purchases (for example, via a merchant point-of-sale device, including a contactless payment device). The user can use the digital wallet to complete purchases by selecting a payment option stored by the digital wallet without the need to re-enter financial account information, contact information, or shipping information for each purchase. The user also may select a default payment option to use such that the user can confirm a purchase without making a payment option selection. The digital wallet can be particularly advantageous when utilized to complete a purchase using a mobile device, such as a mobile phone or other electronic device.

The user sets up the digital wallet by downloading and installing the digital wallet on a user computing device, typically a mobile device, a wearable device, a laptop or other computing device. Using the digital wallet, the user creates a user account that is typically associated with the one or more payment cards. The user account includes information (e.g., account data) associated with payment options for use in transactions or other information regarding completed transactions. The user may further select to enroll in a receipt generation service for generating dynamic receipts. Once enrolled, the user selects a preferred language and/or preferences associated with generating dynamic receipts. This receipt generation data is stored as part of the user wallet account data. In the example embodiment, the digital wallet transmits the receipt generation data entered by the user to the DRG computing device. The DRG computing device then creates a user profile for the user. The user profile includes the user's receipt generation preferences and a user identifier (ID). The DRG computing device stores into memory the user profile associated with a user ID. In an alternative embodiment, the digital wallet creates and stores the user profile on the user computing device along with the wallet account data. The user receipt generation preferences can be bound to a payment option, such as a digital wallet, a debit card, a credit card, a loyalty card profile, and the likes. Once the user receipt generation preferences are bound to a payment option, dynamic receipts are generated for purchases associated with the payment option.

In another embodiment, the digital wallet can be embodied as a stand-alone application program or as a companion program to a web browser, for example, as a companion program to a Hypertext Markup Language revision 5 ("HTML5") compliant web browser or other type of web browser having messaging and storage capabilities. In a web browser embodiment, the digital wallet can leverage the messaging and storage capabilities of the web browser to provide a consistent buying experience across multiple merchant websites. That is, the digital wallet can provide a consistent user interface independent of merchants' differing websites. The digital wallet also can allow a user to complete a purchase without navigating from the merchant's website as required by third party payment processors. While certain embodiments are described in which parts of the digital wallet are implemented in software, it will be appreciated that one or more acts or functions of the digital wallet may be performed by hardware, software, or a combination thereof, as may be embodied in one or more computing systems.

To complete an online transaction using the digital wallet, a user can navigate to a merchant's website using a web browser and locate one or more products. After the user indicates a desire to purchase one or more products, the digital wallet can interact with the merchant's website and with the user in a secure manner to complete the transaction.

To complete an offline transaction at a merchant's physical store location, the digital wallet, which may be stored on the user's mobile device, can interact with a merchant's point-of-sale device and with the user. The user can activate the digital wallet, for example, by launching an application, by pressing a physical or virtual button on the mobile device, or by making a gesture with the mobile device. The digital wallet can then communicate payment information to the point-of-sale device. The mobile device can communicate with the point-of-sale device using a wireless technology, such as near field communication technology (NFC), BLUETOOTH, changing magnetic fields, or other suitable wireless technology.

Upon initiating the transaction in an offline purchase or an online purchase, the merchant submits the transaction through a payment processor (of a payment network) to an issuing bank (also known as an issuer) for transaction authorization. More specifically, the merchant generates an authorization request message (e.g., ISO 8583 computer message) that is transmitted from the merchant's computing device to an acquirer device (or acquirer processor), which sends the message to a payment processor that then sends the message on to an issuer computing device. The issuer processes the request and transmits an authorization response message back through the payment network to the merchant. The authorization request message either denies or approves the transaction for the cardholder. In the example embodiment, once the issuer approves the transaction and transmits an authorization confirmation to the merchant, the merchant queries the DRG computing device to determine whether the user is enrolled in the receipt generation service. If the user is not enrolled, the merchant proceeds as normal, such as printing out an uncustomized receipt for the user.

If the user is enrolled in the receipt generation service, the DRG computing device or the merchant provides a dynamic receipt. In the first embodiment where the DRG computing device generates the dynamic receipt, the DRG computing device requests and receives an electronic receipt from a merchant (i.e., a point-of-sale device and/or a merchant's computer system). The electronic receipt includes a list of items purchased by the user cardholder along with the purchase amounts associated with the items, and any discounts that may be applied. In most cases, this list of purchased items is listed in the order that the items were scanned in at the POS device. The DRG computing device re-formats the electronic receipt according to the preferences stored in the user profile and generates a dynamic, customized receipt. More specifically, the POS device transmits an API call message to the DRG computing device. The API call message includes an electronic receipt (i.e., a list of items purchased and any coupon discounts or store discounts listed as inputted into the POS device) and a user ID, such as a digital wallet ID or a Chip ID (i.e., a personal account number (PAN), etc.). The DRG computing device uses the user ID to perform a look up of the user profile stored with the memory. The user profile could be part of the digital wallet registration or the PAN registration for the dynamic receipt service. The user profile includes receipt generation preferences associated with generating a dynamic receipt. The DRG computing device generates the dynamic receipt by generating the electronic receipt according to the user preferences. In the example embodiment, the DRG computing device transmits, as a push notification, the dynamic receipt to the digital wallet associated with the user ID. In alternative embodiments, the DRG computing device transmits the dynamic receipt to the user via an email, a SMS message, or the likes.

In the example embodiment and as described below in greater detail, the dynamic receipt generated by the DRG computing device is generated based on the user profile. The produced dynamic receipt may include a particular order of items and a particular way of presenting any discounts. For example, a user cardholder may want to see items purchased on their dynamic receipt in the order of most expensive to least expensive. Thus, the DRG computing device will re-list the items that appear on the initial electronic receipt provided by the merchant in a new order from most expensive to least expensive. The dynamically generated electronic receipt (e.g., updated or dynamic receipt) will then be outputted to the merchant or the user. Another example of how the DRG computing device may customize a receipt per the user profile may include showing any discounts next to the item being discounted as opposed to just showing an aggregated discount at the bottom of the receipt. These examples are provided for illustration purposes. The DRG computing device is configured to re-format or create any format of an electronic receipt that is requested by the user.

In a second embodiment where the merchant generates the dynamic receipt, the merchant provides the dynamic receipt to the user. Once the transaction is completed in an offline purchase or an online transaction with the user, the merchant queries the DRG computing device to determine whether the user is enrolled in the receipt generation service. More specifically, a point-of-sale device or a merchant's computer system transmits an API call message to the DRG computing device requesting receipt generation preferences for the user. The API call message includes a user ID. The DRG computing device identifies the receipt generation preferences associated with a user profile for the user based on the user ID. The DRG computing device transmits the receipt generation preferences and/or the user profile to the point-of-sale device or the merchant's computer system. In one embodiment, the point-of-sale device or the merchant's computer system generates a paper receipt for the user according to the receipt generation preferences. Alternatively, the merchant may generate a digital receipt for the user according to the receipt generation preferences and push a digital receipt to a digital wallet.

The above procedure is also applicable to transactions involving debit cards, credit cards, or loyalty cards (i.e., merchant loyalty cards) associated with a user receipt generation preferences.

Generating the receipt as defined herein includes rearranging or re-formatting the receipt items and/or translating the receipt from a standard language to a desired native language. When entering receipt generation preferences, a user can select arrangement criteria (e.g., grouping and sorting criteria) for changing the arrangement of receipt items for one or more digital receipts. The receipt generation preferences can be applied to the receipt items to rearrange the receipt items from the existing groupings and/or orders into different groupings and/or orders. The receipt items can be displayed on a dynamic receipt in the different groupings and/or orders at a device display. The user's receipt generation preferences may be used to group and/or sort receipt items by price, department, tax, brand, etc. In some embodiments, receipt items from a plurality of digital receipts are rearranged into different groupings and/or orders. Receipt generation preferences can include, for example, discounted items at a top or a bottom of the dynamic receipt, discounts/ vouchers/coupons listed next to the affected item, expensive items on the top or the bottom of the dynamic receipt, alphabetic sorting of products, product category groups (i.e., food, non-food, apparel, etc.), and highlighting items that are tax-deductible and/or reimbursable. In one embodiment, generating a dynamic receipt includes translating the receipt from a standard language to a desired native language. For example, the dynamic receipt identifies purchases as line item descriptions, and, in some cases, the price paid for each line item, in a purchaser's native language.

Accordingly, users can rearrange receipt items as desired to more efficiently perform specified tasks. For example, a user may wish to know how much was spent on groceries over a number of visits to a merchant. As such, the user can select arrangement criteria to group receipt items from a plurality of digital receipts by department and calculate a total price for the receipt items in each grouping. The user can access the dynamic receipts, for example, to easily and quickly determine when certain purchases were made or for budgeting purposes.

In one embodiment, the DRG computing device is configured to analyze and learn about a user's receipt history and preferences. For example, the DRG computing device may determine that a user has purchased an item previously and place the receipt item at the bottom of the dynamic receipt, or that the user has not purchased the item previously and place the receipt item at the top of the dynamic receipt. In certain implementations, the DRG computing device having access to the dynamic receipts stored at the DRG computing device can use the dynamic receipts to learn about spending habits of the user.

In one embodiment, a user can select one or more receipt items listed in a dynamic receipt in a digital wallet that can be selected for an expense report. The digital wallet can be configured to then insert the selected one or more receipt items into the expense report.

A technical effect of the systems and processes described herein include at least one of: (i) efficient generation of a dynamic receipt by a DRG computing device by storing user receipt generation preferences into a memory, wherein the user receipt generation preferences include a user identifier (ID); (ii) efficient generation of a dynamic receipt by receiving an initial electronic receipt at the DRG computing device, wherein the initial electronic receipt results from a transaction performed at the merchant computer system and includes a user ID; (iii) efficient retrieval, by the DRG computing device, of a user profile from the memory by matching a received user ID to a stored user ID; (iv) efficient creation of a dynamic receipt by generating the dynamic receipt according to the preferences associated with the user profile; (v) efficient retrieval of user profile data stored within a database based upon a user identifier so that the DRG computing device can quickly retrieve profile data and generate a dynamic receipt that is customized for the user cardholder while a payment transaction is being processed, and thereby provide a dynamic receipt to the user cardholder when the transaction is completed; and (vi) efficient generation of a dynamic receipt using the DRG computing device that is separate from the merchant POS device and the payment processing network so that the dynamic receipt can be generated as requested by the user cardholder without impacting the speed and processing bandwidth of the payment network.

The technical effects and advantages achieved by this system is at least one of: (a) an improved consumer experience for transactions or receipts; (b) improved storage of receipt information to avoid loss of the receipt or problems that may be associated with recovering proof of payment information; (c) improved visibility of purchased items; (d) increased integration and interoperability between a merchant and a payment entity (e.g., receipt record data may be designed for specific and automatic interoperability between a merchant and a DRG computing device); and (e) improved speed of the payment processing network while providing additional services to the user cardholder (e.g., cardholder receives a dynamic receipt generated by a separate DRG computing device).

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, and/or computers. Each type of transactions card can be used as a method of payment for performing a transaction. As used herein, the term "payment account" is used generally to refer to the underlying account with the transaction card. In addition, cardholder card account behavior can include but is not limited to purchases, management activities (e.g., balance checking), bill payments, achievement of targets (meeting account balance goals, paying bills on time), and/or product registrations (e.g., mobile application downloads).

The following detailed description illustrates embodiments of the disclosure by way of example and not by way of limitation. It is contemplated that the disclosure has general application to processing financial transaction data by a third party in industrial, commercial, and residential applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

Figure 1:
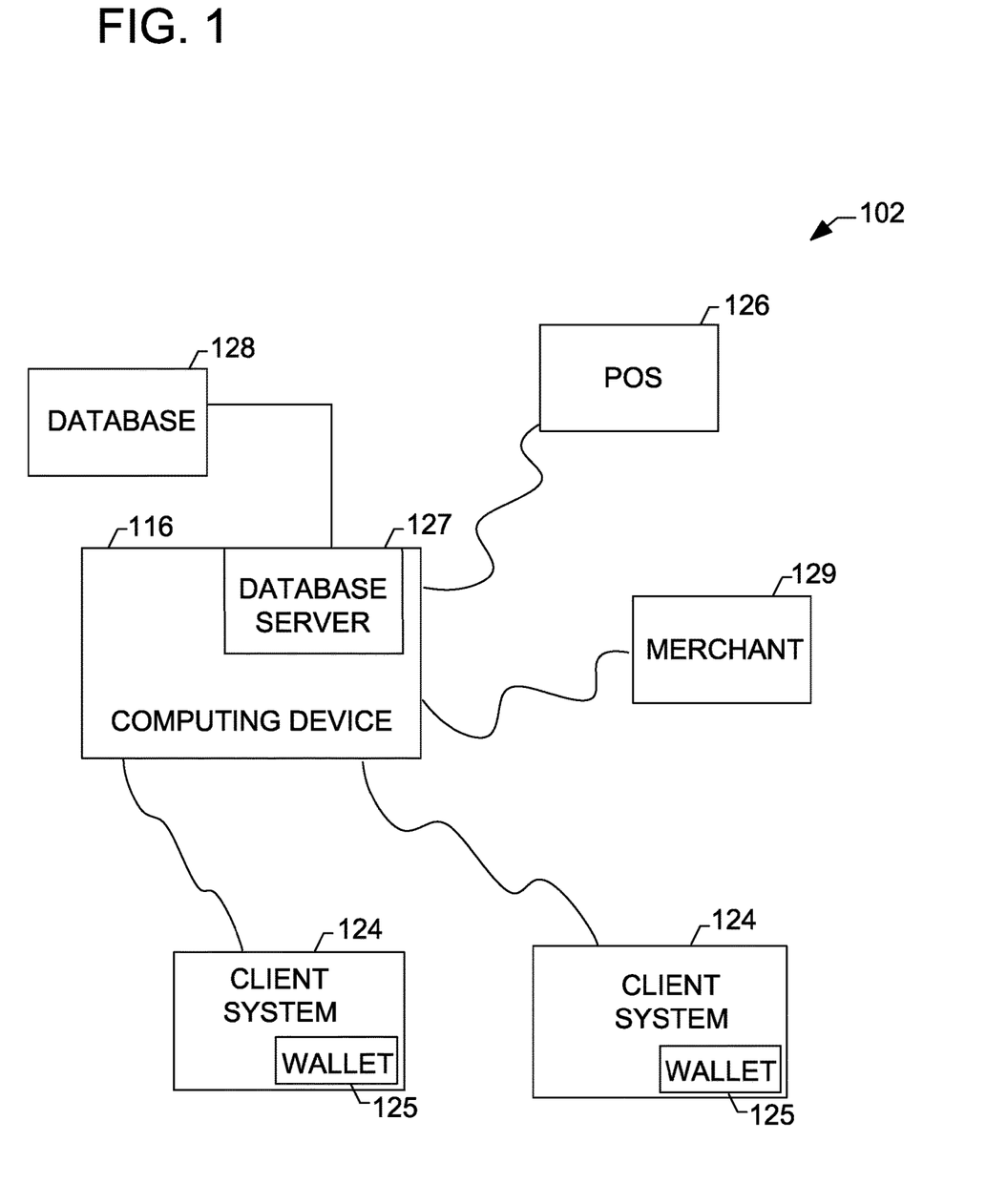
FIG. 1 is a simplified block diagram of a dynamic receipt generation system that includes a receipt generation computing device for generating dynamic receipts for a user.

FIG. 1 is a simplified block diagram of an example embodiment of a receipt generation system 102 for generating dynamic receipts. In the example embodiment, system 102 includes a DRG (receipt generation) computing device 116. In some embodiments, system 102 further includes a plurality of client systems 124 in communication with DRG computing device 116. In the example embodiment, client systems 124 are mobile devices, such as any mobile device capable of interconnecting to the Internet including a web-based phone, also referred to as smart phone, personal digital assistant (PDA), tablets, or other web-based connectable equipment. Client systems may also include a laptop device, a desktop device or any other computing device capable to connecting to the Internet. Although only two client systems 124 are shown for illustration purposes, it should be understood that system 102 could include many more client systems 124. Client systems 124 may be associated with a user such as a consumer, or a cardholder. Client systems 124 may be interconnected to the Internet through a variety of interfaces including a network, such as a local area network (LAN) or a wide area network (WAN), dial-in connections, cable modems and special high-speed ISDN lines. Client systems 124 may include digital wallets 125. Digital wallet 125 includes a computer application, code snippet or any other computer-readable instructions stored on a storage medium that enable a computing device to store account information, payment card information and/or any other information that enables a user to initiate and perform payment transaction using the digital wallet.

In some embodiments, system 102 also includes a point-of-sale (POS) terminal 126 and/or merchant computing system 129, which are in communication with DRG computing device 116. POS terminal 126 may also be in communication with client systems 124. POS terminal 126 may be associated with a merchant and in communication with a payment card system (not show), such as an interchange network or a credit card payment system. POS terminal 126 and/or merchant computing system 129 may be interconnected to the Internet through a variety of interfaces including a network, such as a local area network (LAN) or a wide area network (WAN), dial-in connections, cable modems, wireless modems, cellular communications, and special high-speed ISDN lines. POS terminal 126 may be any device capable of interconnecting to the Internet and of reading information from a consumer's payment card. Merchant computing system 129 may be any system capable of processing online transactions. Although illustrated as including one POS terminal 126, one merchant computing system 129, and two client systems 124, system 102 may include any number of POS terminals 126, any number of merchant computing system 129, and any number of client systems 124 and operate as described herein.

In the example embodiment, DRG computing device 116 is configured to receive user account data and/or receipt generation preferences from client systems 124. DRG computing device 116 is also configured to, among other things, generate user profile data from the received account data, receive requests for user preferences (e.g., user profile data), and receive initial receipt data and/or purchase data from POS terminal 126 and/or merchant computing system 129. DRG computing device 116 is further configured to, among other things, generate dynamic receipts using the user profile data and transmit the dynamic receipt data (i.e., dynamic receipts) to client systems 124 and/or merchant computing device 129 or POS device 126.

In one embodiment, DRG computing device 116 includes a centralized database 128. In an alternative embodiment, database 128 is stored remotely from DRG computing device 116 and may be non-centralized. A database server 127 is connected to database 128, which contains information on a variety of matters, for example, user profiles and receipt generation preferences. In some embodiments, database 128 stores dynamic receipts generated as part of generating a receipt from sales transactions. In some embodiments, database 128 stores data necessary to host an application accessible by users, for example digital wallet applications.

Figure 2:
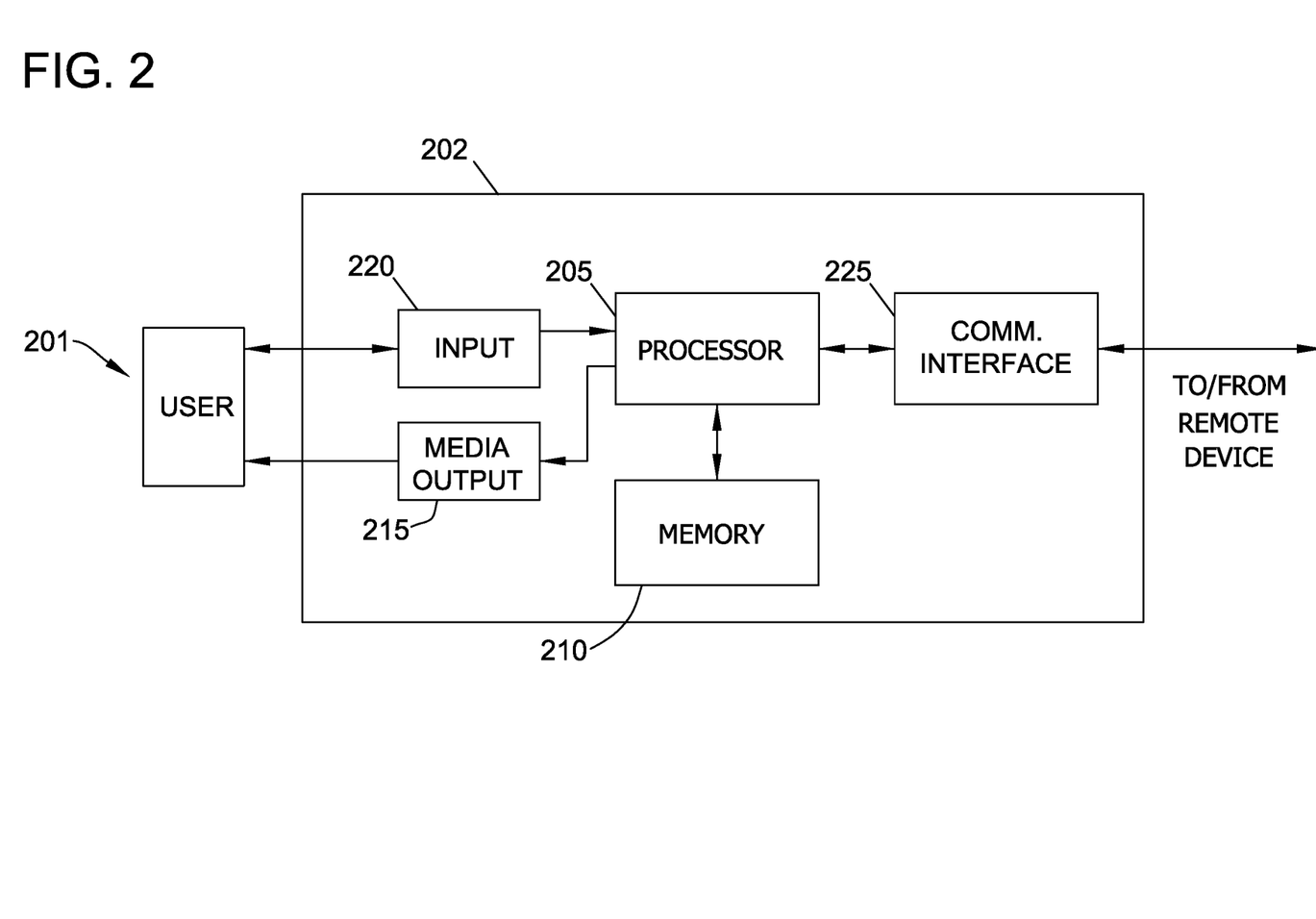
FIG. 2 illustrates an example configuration of a user system such as a client system shown in FIG. 1.

FIG. 2 illustrates an example configuration of a user system 202 operated by a user 201. User system 202 may include, but is not limited to, client systems 124, POS terminal 126, and merchant computing device 129. In the example embodiment, user system 202 includes a processor 205 for executing instructions. In some embodiments, executable instructions are stored in a memory area 210. Processor 205 may include one or more processing units, for example, a multi-core configuration. Memory area 210 is any device allowing information such as executable instructions and/or written works to be stored and retrieved. Memory area 210 may include one or more computer readable media.

User system 202 also includes at least one media output component 215 for presenting information to user 201. Media output component 215 is any component capable of conveying information to user 201. In some embodiments, media output component 215 includes an output adapter such as a video adapter and/or an audio adapter. An output adapter is operatively coupled to processor 205 and operatively couplable to an output device such as a display device, a liquid crystal display (LCD), organic light emitting diode (OLED) display, or "electronic ink" display, or an audio output device, a speaker or headphones.

In some embodiments, user system 202 includes an input device 220 for receiving input from user 201. Input device 220 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 215 and input device 220. User system 202 may also include a communication interface 225, which is communicatively couplable to a remote device such as a payment processor. Communication interface 225 may include, for example, a wired or wireless network adapter or a wireless data transceiver for use with a mobile phone network, Global System for Mobile communications (GSM), 3G, or other mobile data network or Worldwide Interoperability for Microwave Access (WIMAX), or an 802.11 wireless network (WLAN).

Stored in memory area 210 are, for example, computer readable instructions for providing a user interface to user 201 via media output component 215 and, optionally, receiving and processing input from input device 220. The computer readable instructions may include, for example, a digital wallet or other applications that enable user 201 to perform the steps outlined herein. A user interface may include, among other possibilities, a web browser, client application, and a digital wallet. Web browsers enable users, such as user 201, to display and interact with media and other information typically embedded on a web page or a website. A client application allows user 201 to interact with a server application from a server system.

Figure 3:
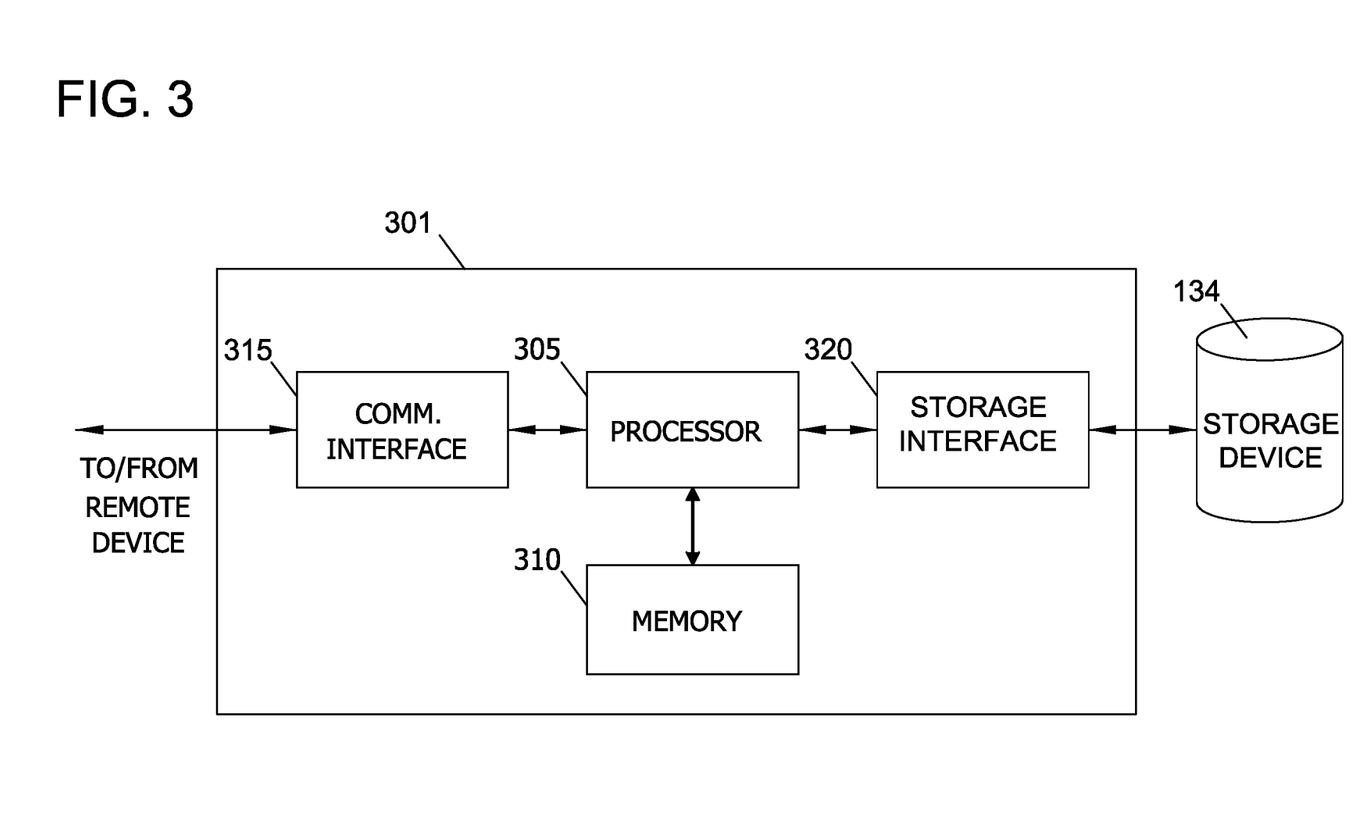
FIG. 3 illustrates an example configuration of the receipt generation computing device shown in FIG. 1.

FIG. 3 illustrates an example configuration of DRG (receipt generation) computing device 116. DRG computing device 116 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on DRG computing device 116, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C #, C++, Java, or other suitable programming languages, etc.).

Processor 305 is operatively coupled to a communication interface 315 such that DRG computing device 116 is capable of communicating with a remote device such as client system 124 or another DRG computing device 116. For example, communication interface 315 may receive data from POS terminals 126 (shown in FIG. 1) and client system 124 (shown in FIG. 1).

Processor 305 may also be operatively coupled to a storage device 334. Storage device 334 is any computer-operated hardware suitable for storing and/or retrieving data. In some embodiments, storage device 334 is integrated in DRG computing device 116. For example, DRG computing device 116 may include one or more hard disk drives as storage device 334. In other embodiments, storage device 334 is external to DRG computing device 116 and may be accessed by a plurality of DRG computing device 116. For example, storage device 334 may include multiple storage units such as hard disks or solid state disks in a redundant array of inexpensive disks (RAID) configuration. Storage device 334 may include a storage area network (SAN) and/or a network attached storage (NAS) system.

In some embodiments, processor 305 is operatively coupled to storage device 334 via a storage interface 320. Storage interface 320 is any component capable of providing processor 305 with access to storage device 334. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 334.

Memory area 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Memory 310 is configured to enable DRG computing device 116 to efficiently generate a dynamic receipt by storing user receipt generation preferences into memory 310, wherein the user receipt generation preferences include a user identifier (ID). Memory 310 is configured to enable efficient generation of a dynamic receipt by receiving an initial electronic receipt at DRG computing device 116, wherein the initial electronic receipt results from a transaction performed at merchant computer system 129 or POS device 126 and includes a user ID. DRG computing device 116 is able to efficiently retrieve the user profile from memory 310 by matching a received user ID to a stored user ID. Efficient retrieval of user profile data stored within memory 310 based upon a user identifier enables DRG computing device 116 to quickly retrieve profile data and generate a dynamic receipt that is customized for the user cardholder while a payment transaction is being processed, and thereby, DRG computing device 116 is able to provide a dynamic receipt to the user cardholder when the transaction is completed. Also, DRG computing device 116 is able to efficiently generate a dynamic receipt because it is separate from merchant POS device 126 and the payment processing network. Thus, the dynamic receipt can be generated as requested by the user cardholder without impacting the speed and processing bandwidth of the payment processing network.

Figure 4:
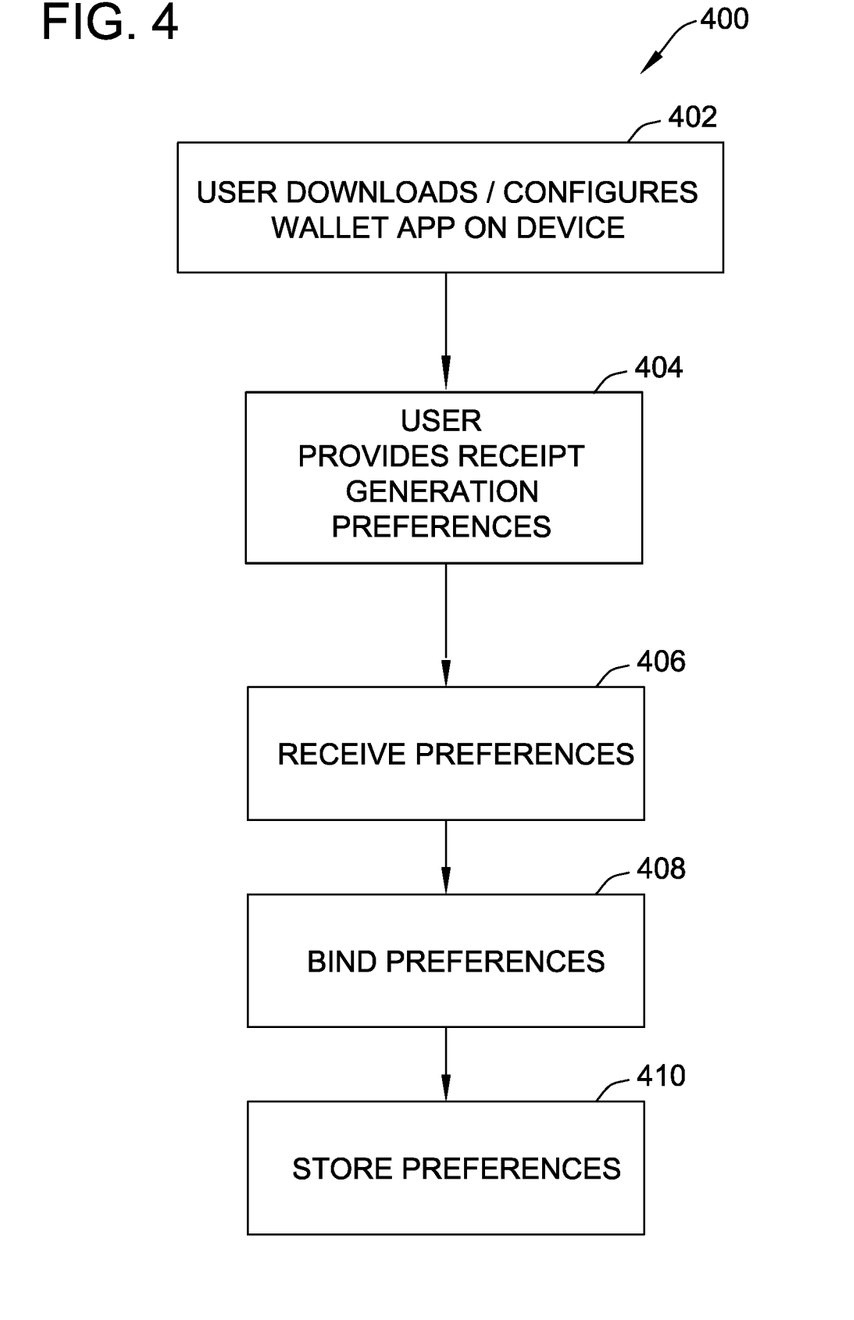
FIG. 4 is an example method for enrolling in the dynamic receipt generation system and providing receipt generation preferences using the receipt generation computing device shown in FIG. 1.

FIG. 4 is an example method 400 for associating receipt generation preferences with a digital wallet using DRG computing device 116, as shown in FIG. 1. A user downloads and configures 402 a digital wallet application on a user computing device, such as a mobile device. The user uses the digital wallet application to enroll in a receipt generation service provided by DRG computing device 116, and provides 404 receipt generation preferences (e.g., account data) to the digital wallet application. DRG computing device 116 receives 406 the receipt generation preferences (account data) from the digital wallet application, and binds 408 (e.g., associates) the receipt generation preferences to a digital wallet, a debit card, a credit card, a loyalty card, or the likes. More specifically, DRG computing device 116 generates profile data for the user based on the account data received from the digital wallet. The profile data includes the receipt generation preferences provided by the user. Once the receipt generation preferences are associated with, for example, a digital wallet, DRG computing device 116 generates dynamic receipts for purchases associated with the digital wallet based on the profile data that is specific to that user cardholder. DRG computing device 116 also stores 410 into a memory the receipt generation preferences associated with a first user identification (ID).

Figure 5:
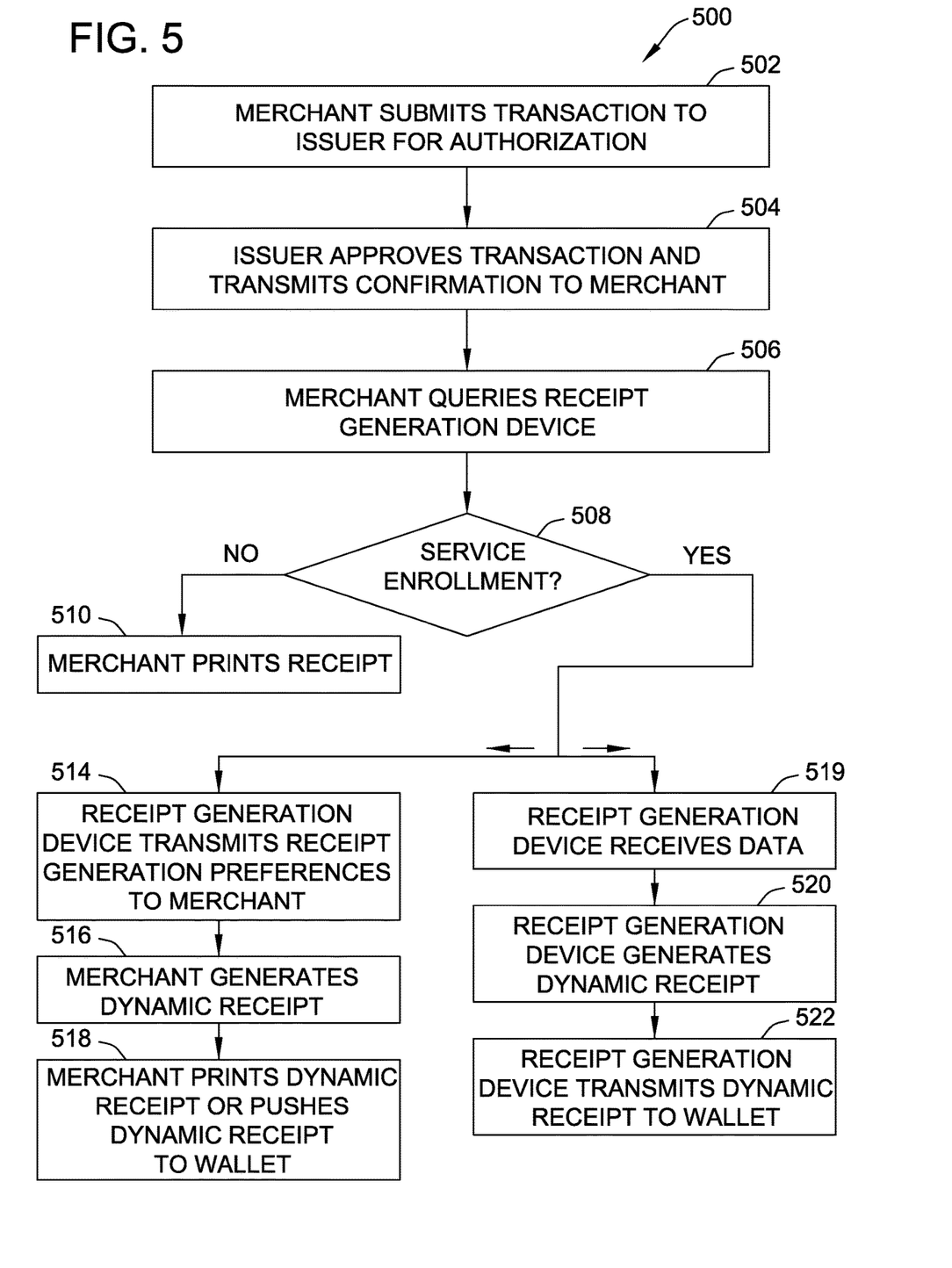
FIG. 5 is an example method for generating dynamic receipts using the receipt generation computing device shown in FIG. 1.

FIG. 5 is an example method 500 for generating dynamic (customized) receipts using DRG computing device 116, as shown in FIG. 1. A user initiates a purchase or a transaction with a merchant. The user uses, for example, a digital wallet associated with a payment card to pay for the purchase. The merchant 502 submits a payment authorization for the transaction to an issuer. The issuer approves 504 the transaction and transmits an authorization response confirmation to the merchant. The merchant then queries 506 DRG computing device 116 to determine whether the user cardholder is enrolled in a receipt generation service. DRG computing device 116 determines 508 whether the user cardholder is enrolled in the receipt generation service. If the user cardholder is not enrolled in the receipt generation service, the merchant proceeds as usual by, for example, printing 510 an uncustomized receipt for the user. If, however, the user cardholder is enrolled in the receipt generation service, DRG computing device 116 generates a dynamic receipt based upon the user profile data and the initial electronic receipt provided by the merchant, and either provides the dynamic receipt to the user cardholder via the digital wallet or provides the dynamic receipt to the merchant device so that the merchant can provide to the user cardholder. In another embodiment, DRG computing device 116 provides the profile data to the merchant device so that the merchant device can generate the dynamic receipt for the user cardholder.

In the embodiment where DRG computing device 116 generates the dynamic receipt, DRG computing device 116 receives 519 initial receipt data and/or purchase data from the merchant computing device. A purchase user identifier (ID) is included with the purchase data. DRG computing device 116 retrieves a user profile from the memory by matching the purchase user ID with the stored user ID. DRG computing device 116 generates 520 a dynamic receipt by generating an electronic receipt having a format that is customized according to the user profile (e.g., generation preferences) associated with the user cardholder. DRG computing device 116 transmits 522 the dynamic receipt to a digital wallet that is, for example, installed on a mobile phone of the user cardholder for storage and/or access by the user cardholder, and/or transmits 522 the dynamic receipt to the merchant computing device/POS device so it can be printed by the merchant and provided to the user cardholder at the point of purchase.

In the embodiment where DRG computing device 116 provides the user profile data to the merchant device for generating the dynamic receipt, DRG computing device 116 transmits 514 the receipt generation preferences (user profile data) to a merchant computing device (i.e., a merchant computer system, a point-of-sales device, etc.). The merchant computing device receives the receipt generation preferences, applies the preferences to the initial electronic receipt, and generates 516 the dynamic receipt. Depending on a merchant preference and/or a user preference, the merchant computing device may then print 518 the dynamic receipt for the user cardholder or sends 520 the dynamic receipt to the user's digital wallet.

Figure 6:
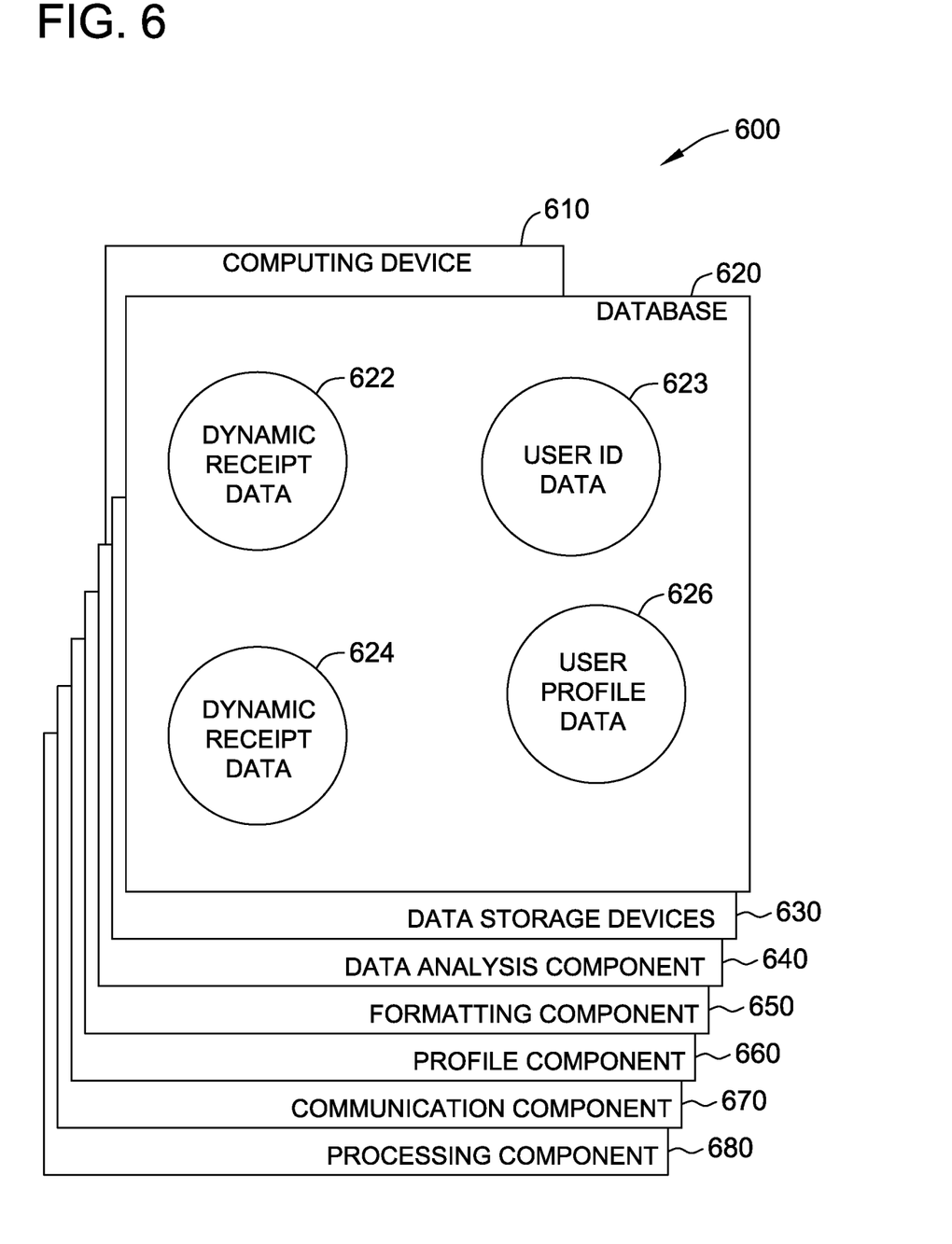
FIG. 6 shows an example configuration of a database within a computing device, along with other related computing components, that may be used to generate dynamic receipts using the receipt generation computing device shown in FIG. 1.

FIG. 6 shows an example configuration 600 of a database 620 within a computing device 610, along with other related computing components, that may be used to generate dynamic receipts in accordance with the present disclosure. In some embodiments, computing device 610 is the same or similar to DRG computing device 116 (shown in FIG. 1). Database 620 is coupled to several separate components within computing device 610, which perform specific tasks.

In the example embodiment, database 620 includes dynamic receipts data 622, electronic receipt data 624, and user profile data 626. In some embodiments, database 620 is similar to database 128 (shown in FIG. 1). Dynamic receipts data 622 includes information associated with dynamic receipts, for example, generated by DRG computing device 116. User identification (ID) data 623 includes information associated with user identifications for users. Electronic receipt data 624 includes information associated with electronic receipts received from merchant computing systems and/or point-of-sale devices. User profile data 626 includes data associated user profiles, including user preferences, created by users.

Computing device 610 includes database 620, as well as data storage devices 630. Computing device 610 also includes a data analysis component 640 for receiving and analyzing receipt data to determine receipt history and receipt generation preferences. Computing device 610 also includes a formatting component 650 for formatting a receipt into a dynamic receipt based on receipt generation preferences. A profile component 660 is also included for receiving and/or creating profiles for users. A communications component 670 provides communications functionality enabling computing device 610 to communicate with other computing components. A processing component 680 assists with execution of computer-executable instructions associated with the system.

As will be appreciated based on the foregoing specification, the above-described embodiments of the disclosure may be implemented using computer programming or engineering techniques including computer software, firmware, hardware or any combination or subset thereof, wherein the technical effect is providing positioning determination using wireless and payment transactions data. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A dynamic receipt generating (DRG) computing device for dynamically generating customized transaction records, said DRG computing device including at least one processor in communication with at least one memory device, said DRG computing device configured to:
  receive real-time transaction data for a payment transaction associated with a purchase made by a user for a plurality of items at a merchant;
  receive an electronic receipt including information of the purchase, the electronic receipt listing the plurality of items in a first order;
  generate a dynamic receipt based on the real-time transaction data and the electronic receipt, the dynamic receipt listing the plurality of items in a second order that is different than the first order, wherein to generate the dynamic receipt, said DRG computing device is configured to reorder the listing of the plurality of items from the first order to the second order by:
    identifying previously purchased items that were purchased by the user in past transactions;
    comparing the plurality of items on the electronic receipt to the previously purchased items;
    determining, based on the comparison, a subset of the plurality of items that match the previously purchased items; and
    listing the subset of the plurality of items that match the previously purchased items at a bottom of the dynamic receipt; and
  transmit the generated dynamic receipt to the user upon completion of the payment transaction.

2. The DRG computing device of claim 1, wherein the real-time transaction data is payment transaction data processed over a payment network wherein the user interacts with the payment network using a payment account at a POS device or through a merchant website.

3. The DRG computing device of claim 1, wherein the real-time transaction data is received by said DRG computing device as an ISO 8583 authorization computer message, the real-time transaction data including a DRG user account identity, a merchant location, and a transaction date.

4. The DRG computing device of claim 1, wherein said DRG computing device is further configured to reorder the listing of the plurality of items based on user preference data, and wherein the user preference data includes at least one of grouping criteria, sorting criteria, alert criteria, language preference, reminders preference, and cardholder information.

5. The DRG computing device of claim 1, wherein to receive an electronic receipt, said DRG computing device is configured to receive the electronic receipt in an API call message from a POS device of the merchant.

6. The DRG computing device of claim 1, wherein said DRG computing device is in communication with a DRG user digital wallet, said DRG computing device further configured to deliver the dynamic receipt to the DRG user digital wallet.

7. The DRG computing device of claim 1, wherein to reorder the listing of the plurality of items, said DRG computing device is further configured to list the items based on at least one of a price of each item, a tax on each item, and a brand of each item.

8. A computer-implemented method for dynamically generating customized transaction records, the method implemented using a dynamic receipt generating (DRG) computing device including at least one processor in communication with at least one memory device, said method comprising:
  receiving real-time transaction data for a payment transaction associated with a purchase made by a user for a plurality of items at a merchant;
  receiving an electronic receipt including information of the purchase, the electronic receipt listing the plurality of items in a first order;
  generating a dynamic receipt based on the real-time transaction data and the electronic receipt, the dynamic receipt listing the plurality of items in a second order that is different than the first order, wherein generating the dynamic receipt comprises reordering the listing of the plurality of items from the first order to the second order by:
    identifying previously purchased items that were purchased by the user in past transactions;
    comparing the plurality of items on the electronic receipt to the previously purchased items;
    determining, based on the comparison, a subset of the plurality of items that match the previously purchased items;
    listing the subset of the plurality of items that match the previously purchased items at a bottom of the dynamic receipt; and
  transmitting the generated dynamic receipt to the user upon completion of the payment transaction.

9. The method of claim 8, wherein the real-time transaction data is processed over a payment network and the DRG memory is communicatively coupled to a payment processor of the payment network to receive the real-time transaction data.

10. The method of claim 8, wherein the real-time transaction data is received by the DRG computing device as part of an ISO 8583 clearing message, the real-time transaction data including a DRG user account identity, a merchant location, and a transaction date.

11. The method of claim 8, wherein reordering the listing of the plurality of items comprises reordering the list of the plurality of items based on user preference data that includes at least one of grouping criteria, sorting criteria, alert criteria, language preference, reminders preference, and cardholder information.

12. The method of claim 8, wherein receiving an electronic receipt comprises receiving the electronic receipt in an API call message from a POS device of the merchant.

13. The method of claim 8, wherein the DRG computing device is in communication with a DRG user digital wallet, further comprising delivering the dynamic receipt to the DRG user digital wallet.

14. The method of claim 8, wherein reordering the listing of the plurality of items comprises listing the items based on at least one of a price of each item, a tax on each item, and a brand of each item.

15. A non-transitory computer readable medium that includes computer executable instructions for generating customized receipts, wherein when executed by a dynamic receipt generator (DRG) computing device including a processor and a memory device, the computer executable instructions cause the DRG computing device to:
  receive real-time transaction data for a payment transaction associated with a purchase made by a user for a plurality of items at a merchant;
  receive an electronic receipt including information of the purchase, the electronic receipt listing the plurality of items in a first order;
  generate a dynamic receipt based on the real-time transaction data and the electronic receipt, the dynamic receipt listing the plurality of items in a second order that is different than the first order, wherein to generate the dynamic receipt, the DRG computing device reorders the listing of the plurality of items from the first order to the second order by:
    identifying previously purchased items that were purchased by the user in past transactions;
    comparing the plurality of items on the electronic receipt to the previously purchased items;
    determining, based on the comparison, a subset of the plurality of items that match the previously purchased items; and
    listing the subset of the plurality of items that match the previously purchased items at a bottom of the dynamic receipt; and
transmit the generated dynamic receipt to the user upon completion of the payment transaction.

16. A non-transitory computer readable medium in accordance with claim 15, wherein the real-time transaction data is payment transaction data processed over a payment network and the DRG memory is communicatively coupled to a payment processor of the payment network to receive the real-time transaction data.

17. A non-transitory computer readable medium in accordance with claim 15, wherein the real-time transaction data is received by the DRG computing device as part of an ISO 8583 clearing message, the real-time transaction data including a DRG user account identity, a merchant location, and a transaction date.

18. A non-transitory computer readable medium in accordance with claim 15, wherein the DRG computing device reorders the listing of the plurality of items based on user preference data that includes at least one of grouping criteria, sorting criteria, alert criteria, language preference, reminders preference, and cardholder information.

19. A non-transitory computer readable medium in accordance with claim 15, wherein the DRG computing device receives the electronic receipt in an API call message from a POS device of the merchant.

20. A non-transitory computer readable medium in accordance with claim 15, wherein the DRG computing device is in communication with a DRG user digital wallet, the DRG computing device further configured to deliver the dynamic receipt to the DRG user digital wallet.

* * * * *